(12) United States Patent
Miller

(10) Patent No.: US 11,643,198 B2
(45) Date of Patent: May 9, 2023

(54) VERTICAL LIFT SINGLE ENGINE VEHICLE SYSTEM

(71) Applicant: Curtis Miller, Wheeling, IL (US)

(72) Inventor: Curtis Miller, Wheeling, IL (US)

( * ) Notice: Subject to any disclaimer, the term of this patent is extended or adjusted under 35 U.S.C. 154(b) by 519 days.

(21) Appl. No.: 16/547,989

(22) Filed: Aug. 22, 2019

(65) Prior Publication Data

US 2020/0223541 A1 Jul. 16, 2020

Related U.S. Application Data

(60) Provisional application No. 62/918,122, filed on Jan. 15, 2019.

(51) Int. Cl.
*B64C 29/00* (2006.01)
*B64D 37/30* (2006.01)
*F02K 3/10* (2006.01)

(52) U.S. Cl.
CPC .......... *B64C 29/0025* (2013.01); *B64D 37/30* (2013.01); *F02K 3/10* (2013.01)

(58) Field of Classification Search
CPC .............. B64C 15/02; B64C 2003/445; B64C 2003/543; B64C 2003/147; B64C 39/0058; B64C 39/0066; B64C 29/0025; B64C 1/064; B64C 1/065; B64C 1/061; B64C 9/34; B64D 37/30; B64D 2033/0253; B64D 2033/0266; B64D 2033/0273; B64D 2033/0293; B64D 27/14; B64D 27/20; F02K 7/10; F02K 7/16; F02K 1/38; F02K 3/10; F23R 3/06; F23R 3/34; F23R 3/346
See application file for complete search history.

(56) References Cited

U.S. PATENT DOCUMENTS

| | | | | |
|---|---|---|---|---|
| 1,698,849 A * | 1/1929 | Leisy | ............ | B64C 1/061 |
| | | | | 244/119 |
| 2,716,329 A * | 8/1955 | Lunger | ............ | F02C 7/224 |
| | | | | 60/39.461 |
| 3,613,826 A * | 10/1971 | Cabassut | ............ | F02K 1/383 |
| | | | | 181/219 |
| 3,807,169 A * | 4/1974 | Bradford | ............ | F02K 7/18 |
| | | | | 60/39.47 |
| 4,567,960 A * | 2/1986 | Johnson | ............ | F02K 1/38 |
| | | | | 239/265.17 |

(Continued)

FOREIGN PATENT DOCUMENTS

| CA | 2972722 A1 * | 2/2018 | ............ | B64C 27/14 |
|---|---|---|---|---|
| DE | 10126632 A1 * | 9/2002 | ............ | B64C 15/02 |

(Continued)

OTHER PUBLICATIONS

Stephan Wilkinson, "Zwrrwwwbrzr," Jul. 2003, Smithsonian Air & Space Magazine (Year: 2003).*

*Primary Examiner* — Joshua J Michener
*Assistant Examiner* — Ryan Andrew Yankey
(74) *Attorney, Agent, or Firm* — K&L Gates LLP

(57) ABSTRACT

The present vertical lift vehicle system can include a single internal combustion engine, a single propeller, and a plurality of small ducts. The small ducts can connect to a single main duct acting as a combustion chamber, wherein the combustion chamber combines air from the small ducts with propane, wherein when ignited the contents of the main duct produce added thrust to the vehicle as it exits the main duct.

10 Claims, 6 Drawing Sheets

(56) References Cited

U.S. PATENT DOCUMENTS

| | | | | |
|---|---|---|---|---|
| 4,910,957 A * | 3/1990 | Moreno | ............... | F23R 3/346 60/737 |
| 2002/0172904 A1* | 11/2002 | Freeman | ............... | F23R 3/346 431/177 |
| 2003/0033798 A1* | 2/2003 | Dickau | ............... | F02K 3/075 60/228 |
| 2003/0150954 A1* | 8/2003 | duPont | ............... | B64C 15/02 244/12.5 |
| 2006/0284022 A1* | 12/2006 | Harrigan | ............... | B64C 9/34 244/203 |
| 2008/0092543 A1* | 4/2008 | Berg | ............... | F02K 9/82 60/734 |
| 2010/0095649 A1* | 4/2010 | Blouch | ............... | F23R 3/36 60/39.463 |
| 2011/0127373 A1* | 6/2011 | Thomas | ............... | B64C 39/024 244/65 |
| 2014/0090354 A1* | 4/2014 | Scipio | ............... | F01D 25/305 60/39.5 |
| 2016/0076461 A1* | 3/2016 | Kawai | ............... | B64D 37/30 60/39.463 |
| 2016/0130011 A1* | 5/2016 | Moore | ............... | B64D 33/06 239/265.17 |
| 2017/0241341 A1* | 8/2017 | Gekht | ............... | B64D 33/02 |

FOREIGN PATENT DOCUMENTS

| | | | | |
|---|---|---|---|---|
| DE | 102009048201 A1 * | 4/2011 | ......... | B64C 29/0025 |
| DE | 102012110805 B3 * | 2/2014 | ............ | B64C 3/50 |
| EP | 0315485 A2 * | 5/1989 | ............ | B64C 3/50 |
| EP | 0615903 A1 * | 3/1994 | ............ | B64C 27/46 |
| EP | 1760271 A2 * | 3/2007 | ......... | F01D 17/143 |
| EP | 2409915 A1 * | 1/2012 | ........... | A63H 27/001 |
| GB | 101434 A * | 9/1916 | ............ | B64C 3/18 |
| GB | 2124562 A * | 2/1984 | ......... | B64C 29/0066 |
| WO | WO-2019094765 A1 * | 5/2019 | ......... | B64C 29/0033 |

\* cited by examiner

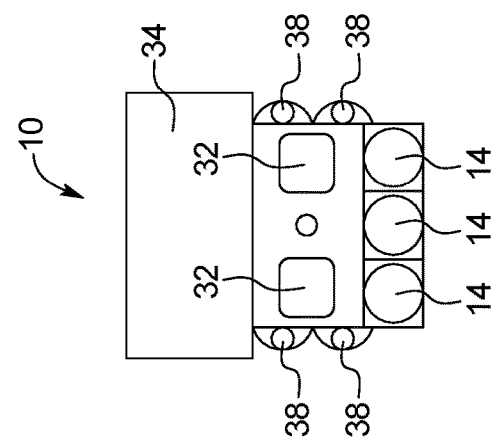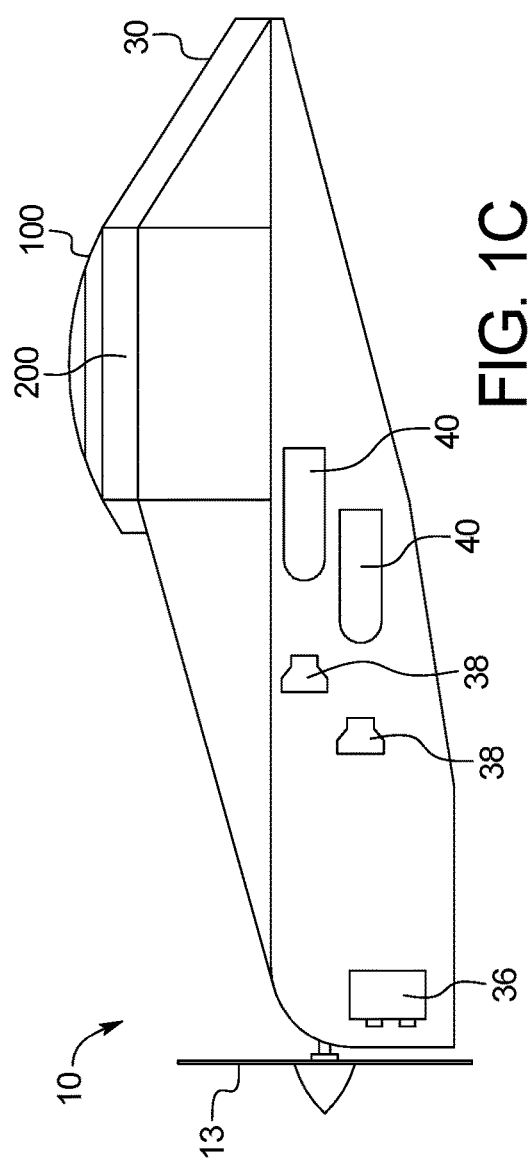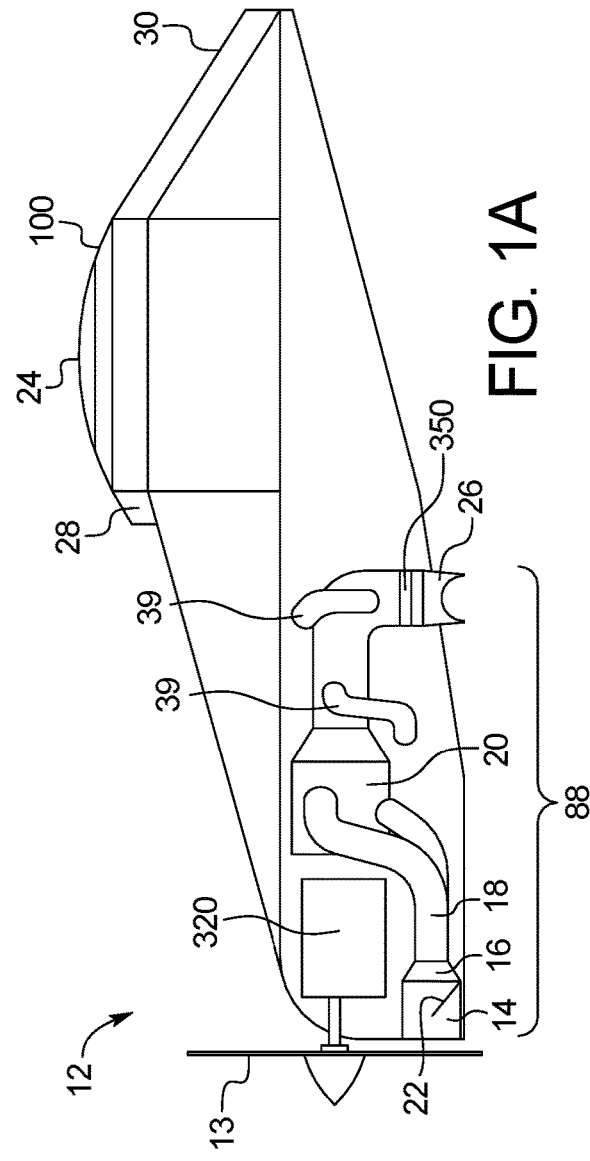

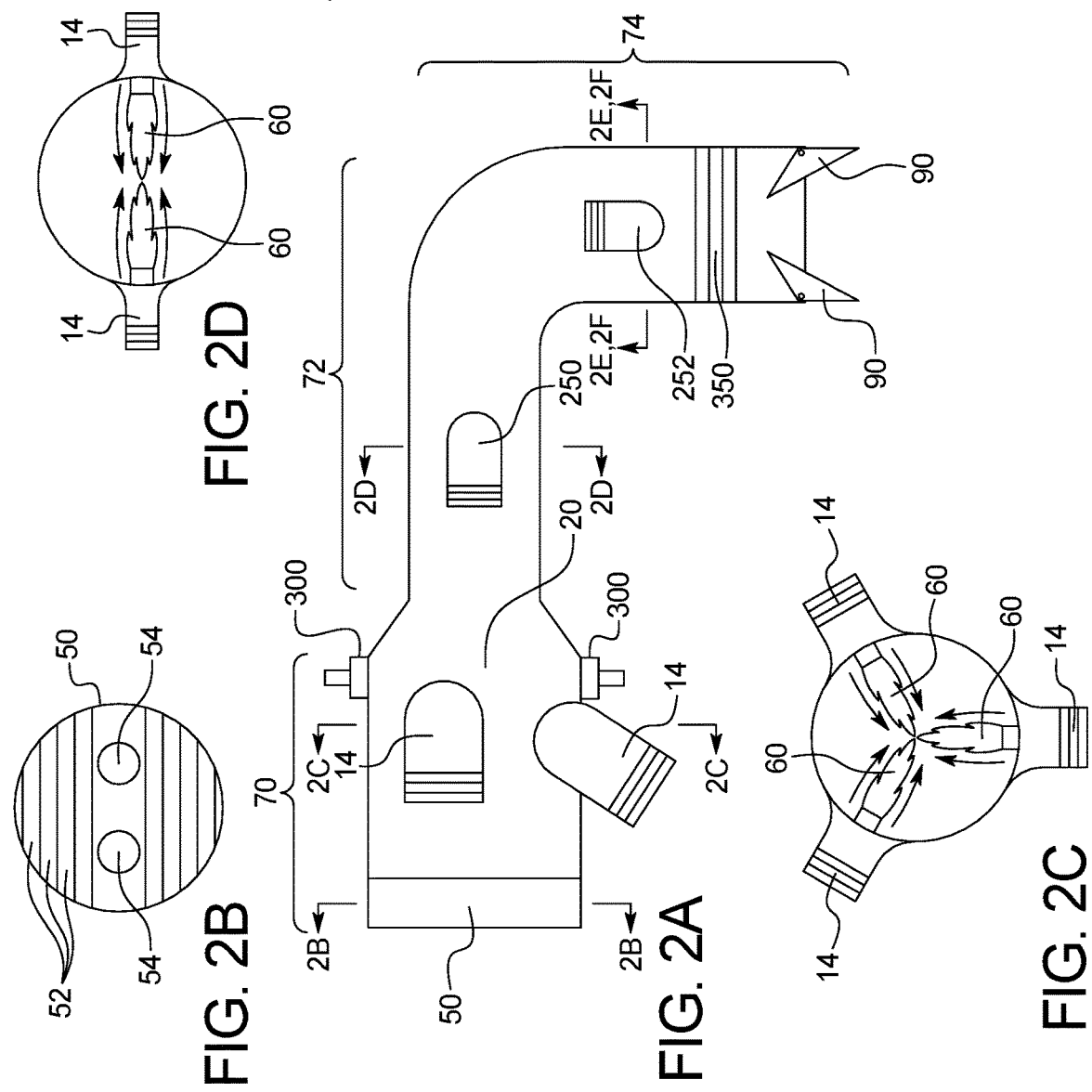

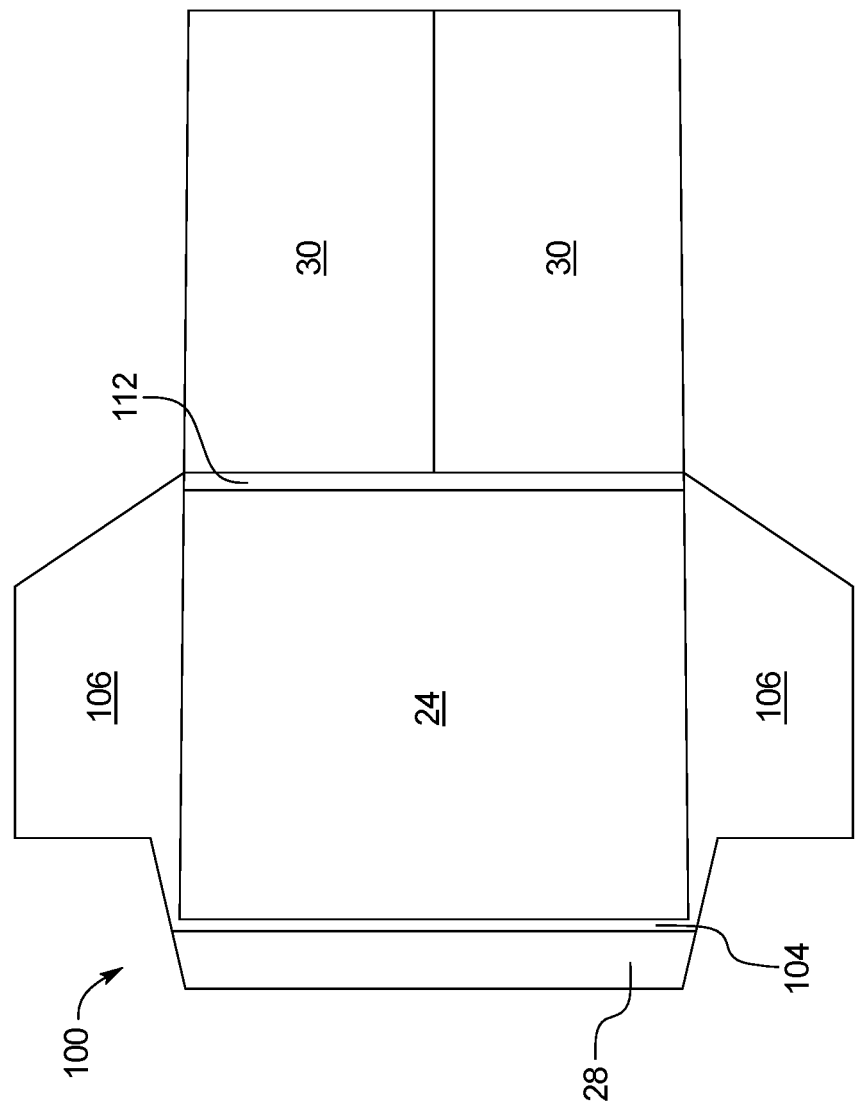

VERTICAL LIFT SINGLE ENGINE VEHICLE SYSTEM

CROSS-REFERENCE TO RELATED APPLICATIONS

This application incorporates by reference and claims the benefit of priority to U.S. Provisional Application 62/918,122 filed on Jan. 15, 2019.

BACKGROUND OF THE INVENTION

The present subject matter relates generally to vertical lift aircrafts.

Various systems exist for autonomously piloted aerial vehicles that are able to take off, loiter, and land without the use of a runway. Vertical takeoff and landing (VTOL) vehicles address this limitation and may come in various forms of hand-launched aerial vehicles having a main wing and a vertical/horizontal tail control surfaces, or three or four rotor propellers that are operable to take off and land vertically. Aerial vehicles having a main wing and a vertical/horizontal tail control surfaces tend to be more efficient and faster on route, while rotor copters are less efficient in forward flight but have takeoff and landing advantages.

Conventional single rotor helicopters have their center of mass directly below the rotor. However, such configuration prevents the aircraft from tilting its rotor for axial flow in horizontal flight with left developed by a fixed wing. Therefore, it must rely on the rotor's inefficient lift in edgewise airflow with only enough rotor clearance available for a slight tilt to develop some horizontal speed.

Conventional engines used for aircrafts are expensive, complex, heavy, designed only for a specific speed. Moreover, such engines generate larges amount of greenhouse gases.

Accordingly, there is a need for aerial vehicles that are efficient in flight and take-off/landing, while being fuel efficient and environmentally friendly.

BRIEF SUMMARY OF THE INVENTION

The present disclosure provides a single engine vertical lift vehicle systems. Various examples of the systems are provided herein.

The present disclosure provides jet engine technology for small aircraft, wherein the system incorporates advantageous elements of jet engines, bypass fan jet engines, prop fan jet engines, turbo jet fan engines, ram jet engines, and scram jet engines. The present design uses propane as fuel, which is less expensive and damaging to the environment. The present system is designed for small aircraft, and vertical take-off and landing vehicles. In an example, the vehicle system can be used as vertical take-off and landing (VTOL) and/or a short take-off and landing (STOL) when VTOL is not allowed or STOL would be more suitable.

The present vertical lift vehicle system can include a single internal combustion engine, a single propeller, and a plurality of small ducts. The small ducts can connect to a single main duct acting as a combustion chamber, wherein the combustion chamber combines air from the small ducts with propane, wherein when ignited the contents of the main duct produce added thrust to the vehicle as it exits the main duct.

The subject matter of the present application has been developed in response to the increasing interest in power lift or direct lift vehicles. The present vehicle system includes only one engine that can meet the FAA regulations for ultralight, sport pilot and certified aircraft. The vehicle system is designed so that all three axis controls are operational at zero forward speed.

The vehicle system can provide speeds from hover speeds all the way through supersonic speeds using propane to power the engine and ducted combustion. Propane is particularly advantageous as a fuel as it is abundant, relatively inexpensive, safer, and clean burning. Moreover, propane burns at a high air ratio and at a high octane level. Propane tanks are much lighter and constructed from fiberglass, which do not result in boiling liquid expanding vapor explosion (BLEVE). Further, the system can employ fiberglass tanks that do not explode in a fire but instead slowly burn off propane, resulting in a much safer fuel source. The system can include propane tanks in standard 5 and 7.5 gallons sizes, wherein the propane tanks are designed to be aerodynamically efficient and can be attached towards the center and/or rear exterior of vehicle on each side so that tanks are further from combustion chamber and engine. The propane tanks can be configured to provide up to a total of 30 gallons of propane fuel. Propane tanks not only provide fuel but, because they are under pressure providing additional energy in the form of stored pressure, also reduce the need for fuel pumps since the fuel is under pressure. Propane filling stations and propane tanks are quite common and familiar to most people adding to convenience and efficiency.

The present system supports supersonic travel by at least the following characteristics: (1) the vehicle shape supports area rule requirements, (2) the wing shape is thin but not swept and the side sections of airfoil are symmetrical forward to aft aiding supersonic travel, and (3) the rear wing panels encompass a large section of the overall wing and act as elevons. The combination provides robust and extensive area for pitch and roll control even at supersonic speeds wherein control surface effectiveness typically diminishes with less surface area. The present vehicle system has a small cross sectional area and a low weight improving the supersonic abilities. The lack of a tail, small cross section, and low weight in the present system reduces sonic boom to negligible decibels. The front intake flap(s) can assist in the formation of sonic waves adding to the intake air compression.

The wing shape can be based on Liebeck's thin airfoil design. As a result, the vehicle system can fly like a normal aircraft. For example, the system can take off like a normal aircraft if needed and supports required stall speeds with power off. Canards can be included that share the same airfoil shape as the side airfoil extension panels on the main wing.

The system can include a main duct combustion chamber that contains no moving parts and is empty except for air and fuel. Smaller intake ducts can connect to the main duct, wherein the intake ducts can be separated by 120 degrees resulting in the minor ducts being equally spaced around the circumference of the main duct. At least a portion of the intake ducts can be made of galvanized steel and/or can be made more resistant to high temperatures by applying sheets of carbon fiber weave to the inside of the duct surface using glue special designed for carbon fiber and resistant up to 5400° F.

At high speeds, the main airfoil positioned above the top surface of the fuselage body can engage to provide lift allowing duct exhaust flow to be used almost entirely for the purpose of forward thrust. Exhaust flow (e.g., vectored thrust control) from the main duct combustion chamber along with elevons can be used to control a pitch angle of the vehicle. Exhaust from internal combustion engine can be redirected through the main duct to add heat and mass flow to the duct.

The engine design in the present system can be a hybrid between a turbo fan jet and a ramjet. Ramjets are simple but only become efficient at high speeds, while turbo fan jets are efficient at lower speeds but are much more complicated. The present design has characteristics of ramjet but provides static thrust when vehicle is not moving. A lower part of the air stream from the propeller provides high speed air into intake ducts that compress when combined together in the main combustion chamber where combustion can occur. A second stage of the duct system can provide additional side intake ducts for more air and compression in the main combustion chamber. Finally, a third stage of the duct system can provide additional side intake ducts for additional air and cooling. The duct system can include an exit nozzle providing variable outlet/directional thrust vectoring.

The present system has a unique wing design. The wing can be comprised of polycarbonate and carbon fiber sandwich panels, wherein the design can be uncomplicated yet allows for the wing to be thin, flexible, and mobile (e.g., change shape) in flight. For example, the wing can be highly curved at low speed for increased lift, and flatter at high speed for less drag.

Fuselage design of the present system is advantageous. The sides of the aircraft fuselage can be strong carbon fiber sandwich flat panels. A panel on each side of the fuselage provides the system's load bearing similar to load bearing walls. In order to connect additional items to the system structure, a cross bar connecting the two sides can be installed to provide a mounting surface, which also adds additional structural integrity to the fuselage. The top half can be a traditional frame design that is covered with polycarbonate windows and connects to lower fuselage.

The present system allows for a vertical take-off and landing (VTOL) that would qualify for FAA sport pilot designation. An upper half of the propeller generates high speed air that sends air over the rear wing creating lift even when aircraft is not moving. In addition, the upper half of the propeller loads air over the elevons in the wing such that control surfaces can be functional even when the aircraft is not moving. A lower half of the propeller can provide air for new engine design to provide lift to front of vehicle system. The lower half of the propeller air can load the rudders even when the vehicle is not moving so they are functional at all times. The vehicle system can have a small number of control surfaces and smaller wing size providing a much smaller drag profile.

An advantage of the present system is its efficient design, light weight, ease to manufacture, and ability to operate at various speeds.

A further advantage of the present vehicle system is that it is an efficient single engine VTOL that runs on propane, hydrogen, natural gas, and/or ammonia, resulting in an inexpensive and cleaner burning than gasoline.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1A illustrates an example of a cross sectional side view of an example of an interior fuselage composite of the vehicle system.

FIG. 1B illustrates an example of a front view of an external fuselage front view.

FIG. 1C illustrates an example of a side view of the external fuselage.

FIG. 2A illustrates an example of a side view of the combustion chamber composite 20.

FIGS. 2B-2G are examples of cross sectional views of the combustion chamber composite.

FIG. 3 is an example of a top view of a main wing.

DETAILED DESCRIPTION OF THE INVENTION

Figure 4A:
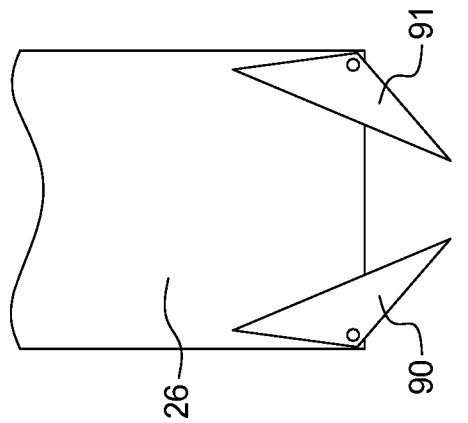
FIGS. 4A-4E illustrate examples of variable geometry for the exhaust flap control composite.

The present vertical lift vehicle system 10 having a single internal combustion engine fueled by propane can meet FAA regulations for ultralight, sport pilot, and certified aircrafts. The present vehicle system 10 is designed for subsonic, trans-sonic, and supersonic speeds. The present aircraft can include one to four seats arranged in any suitable matter, including two by two seats and/or one seat behind another seat. Of course, additional seats are contemplated. A single engine can control a single vertically mounted propeller, wherein the propeller can be large enough (e.g., approximately 50 to 60 inches long) to provide a large air stream.

The present system includes a fuselage body with a front propeller. The air stream from the propeller 13 is split into an upper half air stream and a lower half air stream. The upper half air stream is directed uninterrupted to a high lift thin airfoil 100 attached above the top surface 200 of the vehicle fuselage body towards the rear. Specifically, the upper half air stream can enter under the front section 28 of the airfoil 100 that can increase lift, but also increase drag depending on the angle of the front section 28. For example, in the present system the front section 28 of the airfoil can be flexible such that the front section 28 can change position (e.g., an angle) at different speeds. For example, the front portion 28 can point downward during slow speeds to add lift and then straighten out (e.g., parallel to the top surface of the fuselage) at high speeds when the extra lift is not needed. The upper half air stream can flow above and below the airfoil 100 providing lift aft of the center of gravity. The airfoil 100 provides stable lift available at zero forward airspeed. The rear half of the airfoil is split into two panels 30 wherein each entire panel can be moved up or down providing both pitch and roll control effectively becoming elevons. The airfoil 100 configuration allows two to three axis control for a zero forward vehicle speed and provides broad axis control across entire vehicle. The air flowing from the propeller loads the axis control surfaces with the air even when the aircraft is not moving forward.

The lower half of the airstream enters into duct system 88 via at least one (e.g., 2-4) lower ducts 14 as well as vents 52 that provide cooling of the engine. In an example, the lower ducts 14 transition from a square to round shape that drive air into main duct combustion chamber at an approximately 45 degree angle. Although, various shapes of the intake ducts 14 are contemplated. Further, for high speed aircrafts, the intake duct 14 can be a single large rectangular duct with rounded bottom corners that can transition to three round ducts. Each individual intake duct 14 can contain a vapor torch 60 that can eject propane lit by a spark plug at 30 psi into main duct combustion chamber. In an example, only one vapor torch may need a spark ignition system with another two to three torches lit by the torch with the ignition system.

In the first stage 70 of the duct system 88, the air flow from the intake ducts 14 and propane ejection combine at single point inside the first stage 70 of the duct system 88 in communication with the main duct combustion chamber 20 downstream at a 45 degree angle. In the main duct combustion chamber 20 combustion, compression, and acceleration occur increasing mass flow, pressure, temperature, and air speed. The process allows venting airflow from the front of vehicle moving across engine to be scavenged or sucked into main duct combustion chamber 20, increasing overall mass flow. As the combustion continues, the duct size reduces increasing compression. The second stage 72 of the duct system 88 can include two first side ducts 250 further incorporating external airflow from the side ducts 38 through tubing 39 as shown in FIG. 1A. Airflow from two ducts can combine at 45 degrees and contain propane torches and ignite either automatically from the temperature of the existing airflow in main duct or from a spark plug. The third stage can also automatically ignite and/or propane torches can be used. The main duct combustion chamber 72 can then bend in a 90 degree curve pointing the duct perpendicular to the surface of the fuselage body. In the third stage 74 of the duct system 88, second side ducts 252 containing prop stream air from the port and starboard sides of fuselage body connect to the main duct after the 90 degree curve. The side ducts 250, 252 are smaller than the main duct combustion chamber 20 and combine within main duct combustion chamber 20 orientating at angle matching the main air stream. This can cause the air in the main duct to compress further. The cooler air flow inside the smaller ducts allows heat to transfer from the main duct airflow to the small duct airflow, all of which increases the overall air mass-flow and lowers the over air temperature, thereby increasing the overall thrust efficiency.

The third stage 74 of the duct system 88 can include a round flexible duct exit 350 that is heat resistance and allows the duct to move forward or aft up to 45 degrees in either direction for thrust vectoring. The end of the flexible duct exit 350 can be capped with a fixed round to rectangular transition. The rectangular area of the duct can be similar in area to the circular area to limit changes in air pressure. Mounted to the rectangular duct end can be two flaps 90 that allow the exhaust air to be shaped to control exit pressure and air speed. The flaps 90 can allow the exiting airflow to be directed an additional 45 degrees forward or aft for thrust vectoring. In an example, during take-off, the flexible duct 350 and exhaust flaps 90 can be directed towards the front of the aircraft to counter that rest of the airflow stream flow moving rearward generating a force attempting to push the vehicle forward. As a result, the airflow from the flexible duct 350 and exhaust flaps allows for vertical lift without forward motion.

The air stream can flow along each side of the vehicle port and starboard. On each side near the front of the vehicle resides a rudder 36. The rudder 36 can be flush with the side surface of the fuselage body and extends from the fuselage side surface when the rudder is needed to control the aircraft, otherwise it remains flush with the fuselage side surface. The rudders provide yaw control and also have air flow at zero forward vehicle speed allowing control at zero forward speed. In an example, the system can include front mounted canards that provide additional lift but do not contain control surfaces, wherein the canards provide some lift at zero forward vehicle speed.

The exhaust from the duct system 88 can exit downward via the flexible duct 350, which allows for an additional point of lift combining with the lift from the rear high lift air foil to provide two points of lift both forward and aft of center of gravity, which provides a stable and robust lift for vehicle. The exhaust flow from duct system 88 can be directed to control pitch in combination with the elevons. With FAA restricting power lift vehicles as much as possible, each vehicle rating must provide lift at required stall speeds even when engine is not running The configuration of the high lift thin airfoil 100 along with a main thrust duct 88 that can continue to have airflow driven through it even if engine and propane are not running provides enough lift to maintain stable flight at stall speed required FAA levels, wherein the vehicle system 10 can fly as a normal aircraft without the use of vertical lift capability to better meet FAA regulations.

The main duct combustion chamber 20 provides efficient compression, while placing the combustion at center of duct allowing cooler air to flow around on all sides. This provides the most effective heat transfer to the cooler air while keeping combustion furthest from sides of duct, which allows the scavenging or sucking of the air from the engine ventilation allowing for the greatest amount of mass flow.

Air entering into the lower ducts 14 can be control by entrance flap 22 that can be moved up or down providing variable geometry inlet control. The flap tip can be used at supersonic speeds to help control sonic wave formation. The location of the flap at supersonic speeds will combine the need for air speed control with the need to maximize the sonic wave flow. Screens to slow down airflow can be placed on inlets of the vapor torches if airflow is deemed too fast for propane to be ignited by spark plug in the vapor torch. Duct sections can be attached using screw, rivets, clamps, bolts, tape, tabs, and/or sealants, among others.

The speed of vehicle can be controlled by increasing or decreasing the following: engine shaft/prop rotation, propane flow, duct inlet size, exhaust duct angle, and exhaust duct variable geometry flap exit size, wherein the combination enables for robust speed control.

At higher speeds approaching trans-sonic, the airflow through intake and side ducts can provide all mass flow and pressure along with propane combustion to propel aircraft forward with the propeller no longer needed. The propeller can be disengaged by the controller and locked into place with blades rotated into a position that provides the least drag. The engine can continue to run at lower rpm's to maintain vehicle systems. The duct system can provide all forward motion and will continue to build power and speed until the drag of the vehicle exceeds the thrust the ducting system can provide. In an example, the system can be allowed to continue to run at low speeds at supersonic travel if it provides a sufficient benefit of slowing down the speed of the air around the fuselage versus the penalty for air drag created. In an example, the system can run at full speed during supersonic travel if once again the slowing down of air around the fuselage provided greater benefit than the air drag created and fuel used by the prop but this is unlikely.

FIG. 1A illustrates a cross sectional side view of an example of the interior of the body 12 of the vehicle system 10. The system 10 can include a vehicle propeller 13 attached to the front of the fuselage body, a duct system 88 providing a combustion chamber 20, and a combustion engine 320 that can use propane as fuel. Intake ducts 14 can include a transition portion 16, wherein the transition portion transitions the square shape of the intake duct 14 to a round shape portion 18 that feed air into combustion chamber 20. A flap 22 can be positioned within the intake duct 14 or about the entrance of the intake duct 14 that can rotate up or down to control air flow into intake ducts 14, wherein the flap 22 can increase or decrease amount of air flowing into the hybrid jet engine. Each intake duct 14 can have individual flap 22 or one large flap can control air flow into all three intake ducts 14. The system includes a variable geometry exit duct 26 that can rotate forward or rear to redirect airflow, wherein a controller of the system can control the direction of the exit duct 26. The direction of airflow from the exit duct 26 can be used to balance the aircraft as well as move aircraft forward or reverse.

The airfoil 100 can serve as a flexible wing comprised of carbon fiber for strength and polycarbonate for strength and flexibility. The airfoil 100 can include a front portion 28 that is able to flexibly rotate up or down, a top portion 24, and rear panels 30 that can flexibly rotate up or down. The rear panels 30 act as both ailerons and elevons controlling pitch and roll.

FIG. 1B illustrates a front view of an external fuselage front view. The three square intake ducts 14 transition to round tubing 18 connected to the combustion engine 20. The intake ducts 14 provide air flow to main combustion chamber through flexible ducting. Side intake ducts 38 provide additional airflow to hybrid jet engine. Front ventilation 32 can provide cooling around the outside of the combustion chamber as well as can provide supplemental airflow into the combustion chamber if needed. A sloping front windshield 34 can angle all the way to the cockpit.

FIG. 1C illustrates a side view of the external fuselage. The side rudder 36 can sit flush to fuselage (and appear on both sides), wherein the side rudder 36 can be extended when need on either side of fuselage to control yaw. The system 10 can include side air intakes 38 that feed air into hybrid jet engine. The external sides of the fuselage can include side mounted fiberglass propane tanks 40 (e.g., 7.5 gallons each) providing fuel for both combustion engine and hybrid jet engine. Rear panels 30 that can flex rotate up or down, wherein the rear panels 30 can act as both ailerons and elevons controlling pitch and roll. Airflow from propeller that moves along windshield to the wing, which provides wing with airflow need to create lift.

FIG. 2A illustrates a side view of the duct system 88, wherein FIGS. 2B-2G are cross sectional views. The first stage 70 of the duct system 88 can include an intake cap 50 at entrance to combustion chamber composite 20, wherein the intake cap 50 can include vents 52 on each side with two starter torches 54 in the center, as shown in FIG. 2B, and/or external torches 300. Vents 52 can be open or closed or partially opened depending on what airflow the combustion chamber needed. The starter torches 54 and/or external torches 300 can be used at the initial ignition and/or if the combustion chamber 20 needs to be re-ignited, as the torches are positioned outside the high speed air. FIG. 2C illustrates an example of a cross section of the first stage 70 of the duct system 88 containing the combustion chamber composite 20 wherein the three main intakes ducts 14 that provide air into the combustion chamber are positioned at 45 degrees. Inside each intake duct can be a propane torch 60. FIG. 2D illustrates a cross sectional view of a second stage 72 of the duct system 88, wherein one of two smaller intake ducts providing air into the combustion chamber can be at 45 degrees, wherein each intake duct 14 also has a propane torch 60. FIGS. 2E-2F displays cross sectional views of different options for a third stage 74 of the duct system 88. FIG. 2E illustrates an option for the third stage 74 with two intakes ducts 14 with propane torches 60 adding additional compression and combustion at 45 degrees. During the third stage 74 in the combustion chamber, temperatures can be quite high 20 a section option is available. In the second option for the third stage 74 shown in FIGS. 2F-2G, the two intake ducts 14 on opposite sides that protrude into the duct system 88, wherein the two intake ducts are parallel to the air flow. The parallel configuration adds additional airflow while cooling the existing airflow and the two intake tubes acting like radiators. Flexible tubing of the intake ducts 14 allows the combustion chamber to rotate forward and aft allowing control of the pitch of the vehicle. The variable geometry exhaust 26 allows for shaping the exhaust to control exit airspeed in subsonic, trans sonic and supersonic situations.

In an example, the aircraft can contain mounted ignited torches 300, as shown in FIG. 2A. For example, having igniting torches contained within the intake duct tubes with high speed air may be extinguished. As a result, in an example, the igniting torches 300 can be mounted outside the tubes and in the position along side and perpendicular to the jet engine where static or low speed air can exist.

FIG. 3 is a top view of the airfoil 100. A front portion 28 approximately 8 inches of polycarbonate wing that can flex up or down and can be actuated up or down to control how much air moves over and under the wing. A main top section 24 can be approximately 48 inches wide by 42 inches aft rigid (i.e., non-flexible) airfoil containing a polycarbonate top with a carbon fiber and nomex sandwich sheet bottom. The main section 24 comprises the main part of the wing and is where most of the curvature creating lift is located. The curve is continuous and equal throughout the main top section 24. Note that for slower moving vehicles this curvature can be increase slightly to increase lift with minimal drag increase. Higher speed vehicles will have slightly lower curvature to lower overall drag with slightly less coefficient of lift. Two side portions 106 extending from the main top section 24 can be approximately 30 inches wide by 30 inches aft carbon fiber wing extension. Top portion of the top surface of the fuselage body follows the same shape as the airfoil 100. Two back panel sections 30 of the main wing 100 extending from the main section 24, wherein the panels can be approximately 24 inches wide by 48 inches made of aft carbon fiber and a nomex sandwich panel. The back panels 30 act as elevons that can actuate up or down to control roll and pitch. For example, when both panels are positioned up, the system pitches down. When both panels are positioned down, the system pitches up. When the left panel is up, right panel is down, the system rolls left. When the right panel is up, the left panel is down, the system rolls right. A back transition section 112 of wing where main section 108 airfoil ends can be approximately 2 inches aft seam of polycarbonate. The back transition section 112 connects the carbon fiber and nomex elevon panel. The polycarbonate seam provides a strong sturdy connection that is also flexible allowing the elevons panels to actuate up and down cleanly. A front transition section 28 can be approximately 2 inches aft seam of polycarbonate. The polycarbonate seam provides a strong sturdy connection that is also flexible allowing the front portion of the wing to move up or down, which allows more control over how much air flows over the wing versus being directed under the wing.

Figure 4B:
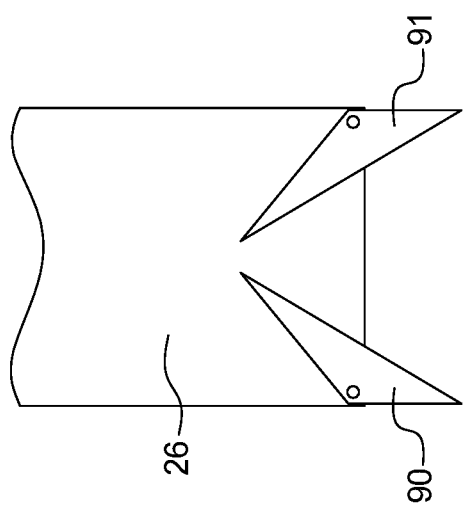
Figure 4C:
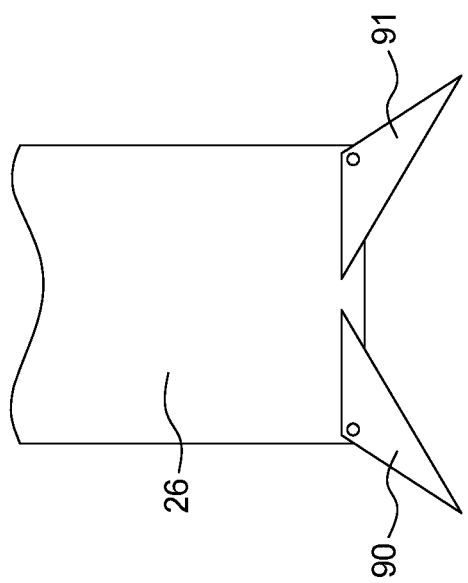
Figure 4D:
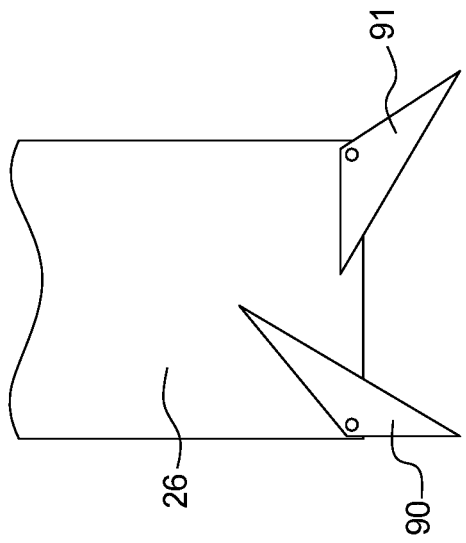
Figure 4E:
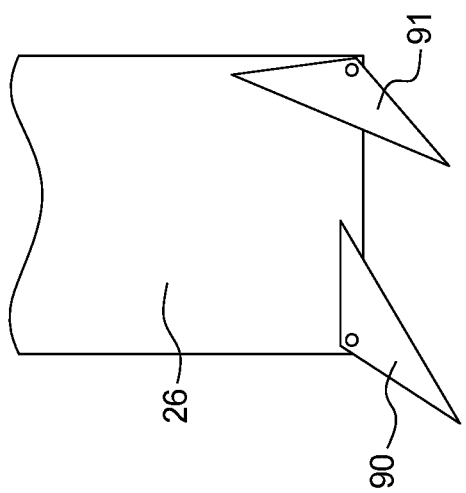

FIGS. 4A-4E illustrate variable geometry for the exhaust flap 90 control composite. Each flap can be any suitable shape, for example, triangular. Actuating the one or more flaps 90 allows for control of exhaust thrust airspeed, pressure and direction. FIG. 4A illustrates a flap 90 configuration wherein both flaps 90 are in an extended position away from the exhaust duct 26, wherein the configuration can be used to increase speed supersonically. FIG. 4B illustrates a configuration wherein the flaps are both in a middle position, wherein the configuration results in no change in pressure or speed. FIG. 4C illustrates a flap configuration wherein both flaps 90 are in a most retracted position within the exhaust duct 26, wherein the configuration can be used to increase speed sub sonically. FIG. 4D illustrates a flap 90 configuration wherein a first flap 90 is in an extended position and the second flap 91 is in a retracted position that angles air flow forward, which can slow or reverse vehicle. FIG. 4E illustrates the flap configuration wherein a first flap 90 is in a retracted position and a second flap 91 is in an extended position that can increase forward thrust.

Figure 5B:
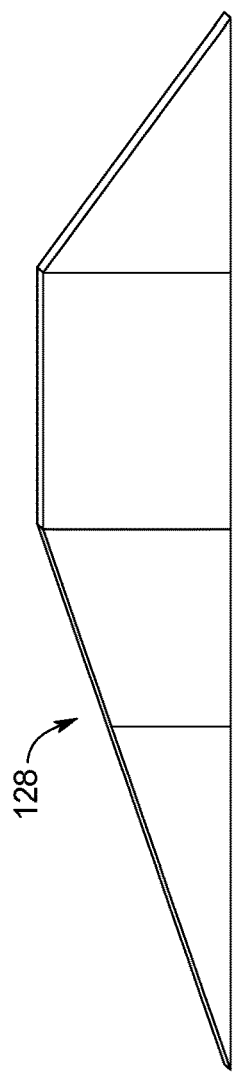
FIGS. 5A-5B is an example of a side view of the fuselage body.
Figure 5A:
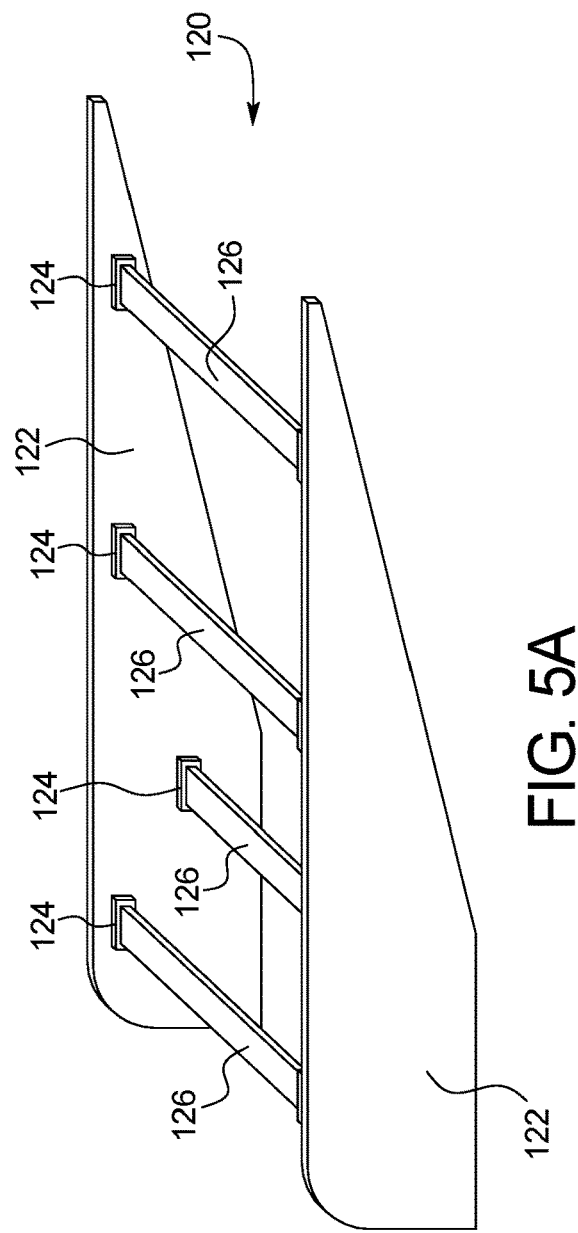
Figure 5C:
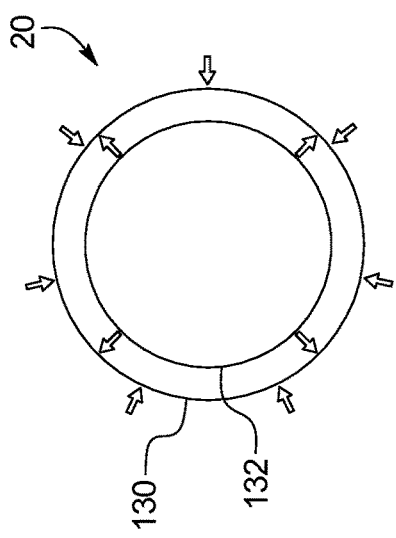
FIG. 5C is an example of a front view of the entrance of combustion chamber.

FIGS. 5A-5B is a side view of the fuselage 120 and FIG. 5C is a front view of the entrance of combustion chamber 20. The fuselage panels 122 can be 0.25 inches thick carbon fiber and/or nomex panel. The panels 122 can be extremely strong, light, and stiff, and can be incorporated into the fuselage design to take a large portion of the load of the rest of the vehicle. The panels 122 can be easily cut to size and can be extended for longer pieces if needed by combining two together using steel connectors and riveted together. "L" brackets 124 (or angle iron) can be cut to size and mounted to the carbon fiber and nomex panels using stainless steel flanged rivets. The brackets 124 can be placed anywhere along the panel where a cross member 126 is needed. A longer bracket 124 can be used where greater load is going to be taken. One inch square aluminum tube can be used for cross members 126 to add strength or add mounting points. The cross members 126 can be attached "L" brackets 124 with either rivets or bolts. 6D. A traditional frame structure 128 can be created from aluminum tubing provides upper fuselage. The frame 128 can be covered in polycarbonate sheets for cockpit windows and adding overall strength to frame. Upper and lower frames can be riveted together. FIG. 5C is an example of an entrance view of the combustion chamber 20. An outer ring 130 of the combustion chamber 20 can be stainless/galvanized steel. An inside ring 132 represents a carbon fiber layer that covers that entire inside of the combustion chamber. Carbon fiber can be attached to the steel not with epoxy but with an adhesive used by high heat foundry's for repairs. The adhesive is not a stiff as normal epoxy used for carbon fiber but will provide much high heat resistance.

The present vehicle system 10 can operate as a vertical take-off vehicle, short take of vehicle, and/or non-vertical aircraft. Propane aided thrust can be shutdown for regular aircraft flight when the propeller thrust is more efficient to maintain cruise speeds.

In an example, the propeller blades can be stored during high speeds, as they are not needed when the system is relying entirely on the main engine thrust for power. For example, at high speeds, the internal combustion engine can be turned off and the propeller shaft locked. When the aircraft is at lower speeds, the combustion engine can reengage and the propeller shaft can be unlocked.

Figure 6A:
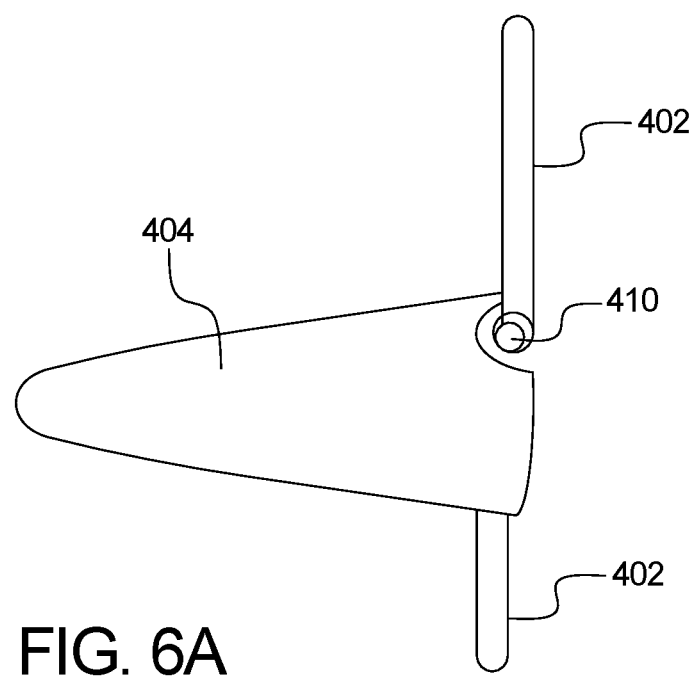
FIGS. 6A-6B are side views of propeller blade positions on the nose cone.

When using a two blade propeller with an in flight adjustable blade setup, the angle of the propeller blades can be electronically changed to a position that can allow the propellers to act as canards and assist in vehicle pitch control at high speeds. One of the blades can be rotated 180 degrees so that the blades would mirror each other on the left and right side. A variable pitch control can be used to make slight changes to the acting canards to assist in the control of the pitch up or down of the vehicle via hinges 410. As shown in FIG. 6A, a mechanical controller can adjust the in flight pitch of the propeller blade 402 around the nose cone 404.

Figure 6B:
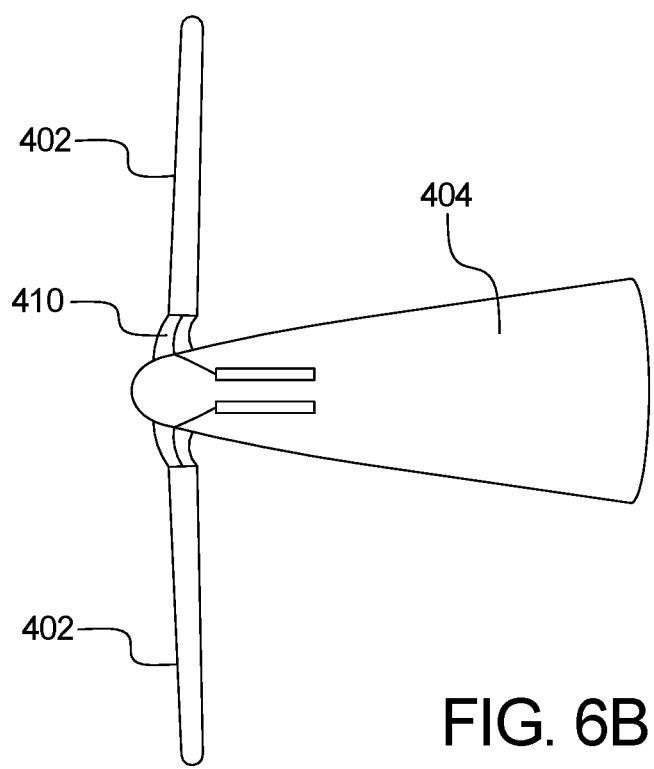

As shown in FIG. 6B, the two blade propellers 402 can be mounted towards the tip of the elongated nose cone 404 (which may be needed for high speed travel). The two blades 402 can be connected to the nose cone 404 via a hinge 410 near the point of the cone. The blades can extend mechanically outward or through centrifugal force when the engine is turning the nose cone at high RPMs. When the engine is turned off at high speed and the propeller shaft can be locked, wherein the two propeller blades can retract flush along the side surfaces of the nose cone. The retraction can be automatically accomplished from the removal of centrifugal force or mechanically.

The various elements of the present aircraft can be controlled by a controller. For example, the position and direction of the exhaust valve, back panels, intake duct flaps, exhaust valve flaps, etc. can be maneuvered via the controller. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A vertical takeoff and landing aircraft comprising:
a fuselage body including a front surface, top surface, bottom surface, and side surfaces, wherein the fuselage body houses a duct system and a combustion engine, wherein the duct system includes:
intake ducts including a front intake duct in the front surface of the fuselage body, a right side intake duct in a right side of the fuselage body, and a left side intake duct in a left side of the fuselage body;
a combustion chamber in communication with the intake ducts within which the combustion engine combusts a mixture of fuel and air; and
a duct exit in the bottom surface of the fuselage body through which exhaust from the combustion chamber exits the aircraft, the duct exit including one or more exit flaps, wherein the exit flaps are configured to be positioned to control an airspeed, a pressure, and a direction of exhaust thrust exiting the aircraft;
wherein the duct system includes a first stage having a first diameter and a second stage having a second diameter smaller than the first diameter and downstream of the first stage, wherein the front intake duct connects to the combustion chamber in the first stage, wherein the right side intake duct and the left side intake duct connect to the combustion chamber in the second stage, and wherein the combustion chamber includes a tapering transition spanning the first stage and the second stage;
a left rudder configured to be positioned to sit flush or extend from a left side of the fuselage body and a right rudder configured to be positioned to sit flush or extend from a right side of the fuselage body, wherein the left rudder and right rudder control yaw of the aircraft in flight;
a single propeller attached to the front surface of the fuselage body, wherein blades of the propeller rotate in a plane perpendicular to the top surface of the fuselage body;
at least one fuel tank attached to the side surfaces of the fuselage body, wherein the air from the intake ducts and fuel from the fuel tanks combine in the combustion chamber to form the mixture of fuel and air; and
a wing positioned above the top surface of the fuselage body, the wing including:
a main portion that is non-flexible and curved to create lift in response to air flowing across the wing;
a front portion extending in front of the main portion, the front portion configured to be actuated up or down to control the amount of air that flows over and under the wing in flight;
a left side portion adjoining a left side of the main portion;
a right side portion adjoining a right side of the main portion: and
two rear panels extending behind the main portion, each rear panel being configured to be independently rotatable up and down to control pitch and roll of the aircraft in flight,
wherein a portion of an air stream from the propeller enters a space between the top surface of the fuselage body and the wing.

2. The vertical takeoff and landing aircraft of claim 1, wherein the intake ducts include an intake flap to control the amount of air entering the intake ducts.

3. The vertical takeoff and landing aircraft of claim 1, wherein the duct system includes a tubular body extending from combustion chamber to the flexible exhaust flap, wherein at least one side intake duct extends from the side surface of the tubular body to an external side of the fuselage body, wherein the side intake ducts include a propane torch, wherein ignition of the propane torch and incoming air increases compression and combustion in the duct system.

4. The vertical takeoff and landing aircraft of claim 1, wherein the fuselage body includes a first side panel on a first side of the fuselage body, and a second side panel on a second side of the fuselage body, wherein the first side panel and the second side panel are parallel to each other, wherein at least one cross bar connects the first side panel to the second side panel.

5. The vertical takeoff and landing aircraft of claim 1, wherein the aircraft only includes one propeller.

6. The vertical takeoff and landing aircraft of claim 1, wherein the aircraft does not include a tail.

7. The vertical takeoff and landing aircraft of claim 1, wherein the combustion engine includes a vapor torch.

8. The vertical takeoff and landing aircraft of claim 1, wherein each intake duct includes a vapor torch configured to eject propane lit by a spark plug into the combustion chamber.

9. The vertical takeoff and landing aircraft of claim 2, wherein each intake flap is configured to rotate up or down.

10. The vertical takeoff and landing aircraft of claim 1, wherein the duct system includes a third stage downstream of the second stage, wherein the combustion chamber includes a 90 degree bend between the second stage and the third stage.

* * * * *